United States Patent [19]
Wang

[11] Patent Number: 5,765,461
[45] Date of Patent: Jun. 16, 1998

[54] CUT-OFF PIECES FEED AND REST MECHANISMS FOR A STEEL CUTTING MACHINE

[76] Inventor: Peter Wang, #5, Lane 101, Sec. 1, Chung Shan Road, Tantzu Hsiang, Taichung Hsien, Taiwan

[21] Appl. No.: 794,953

[22] Filed: Feb. 4, 1997

[51] Int. Cl.[6] .................. B26D 7/06; B26D 7/02
[52] U.S. Cl. ............... 83/157; 83/277; 83/419; 83/461; 83/468.6
[58] Field of Search .................. 83/157, 161, 277, 83/460, 461, 468.6, 54, 167, 419

[56] References Cited

U.S. PATENT DOCUMENTS

| | | | |
|---|---|---|---|
| 1,177,705 | 4/1916 | Johnson | 83/157 |
| 1,189,918 | 4/1916 | Hamilton | 83/157 |
| 3,555,953 | 1/1971 | Irwin | 83/461 X |
| 3,718,061 | 2/1973 | Wilkin | 83/468.6 |
| 4,369,683 | 1/1983 | Bieg et al. | 83/157 |
| 4,397,598 | 8/1983 | Ess et al. | 83/469.6 X |
| 4,727,785 | 3/1988 | Taguchi | 83/277 X |
| 4,967,627 | 11/1990 | Hartmann et al. | 83/157 |

*Primary Examiner*—Eugene Jones
*Attorney, Agent, or Firm*—Pro-Techtor International

[57] ABSTRACT

Material feed and placement mechanisms for a steel cutting machine result in a power saving and accurate clamping device. A workpiece is moved into cutting position and clamped in place by the feed mechanism. After being cut by the cutting machine, the cut piece is slowly laid down by the placement mechanism. Not only can noise and vibration be eliminated, but also the safety of workers is improved, and machine life is extended.

2 Claims, 6 Drawing Sheets

CUT-OFF PIECES FEED AND REST MECHANISMS FOR A STEEL CUTTING MACHINE

BACKGROUND OF THE INVENTION

1. Field of the Invention

The present invention relates to material feed and placement mechanisms for a steel cutting machine, and especially to new structures of material feed and placement mechanisms for a large size steel material cutting machine.

2. Description of the Prior Art

A conventional large size steel material (the material may be as large as several tons by weight) cutting machine normally is not provided with an effective clamping device. Therefore, the size of a workpiece after cutting is not always accurate, and a longer processing time is required. Further, the conventional cutting machine generally uses waste rubber tires placed on the ground behind the machine to receive cut pieces. The cut pieces fall directly on the waste tires. This not only creates violent vibration and noise, but also may damage the workpiece and the mechanical equipment as well as creating danger to workers.

SUMMARY OF THE INVENTION

In view of this, the inventor of the present invention provides the material feed and placement mechanisms for a steel cutting machine after much study and development to avoid the defects in the conventional devices.

A primary object of the present invention is to provide new material feed and placement mechanisms for a steel cutting machine. The device results in a power saving and accurate clamping device. A workpiece after being cut by the cutting machine can be slowly laid down by the placement mechanism. Not only can noise and vibration be eliminated, but also the safety of workers is improved.

These and other objects and advantages of the present invention will become apparent to those skilled in the art in view of the description of the best presently known mode of carrying out the invention as described herein and as illustrated in the drawings.

DETAILED DESCRIPTION OF THE PREFERRED EMBODIMENT

Figure 1:
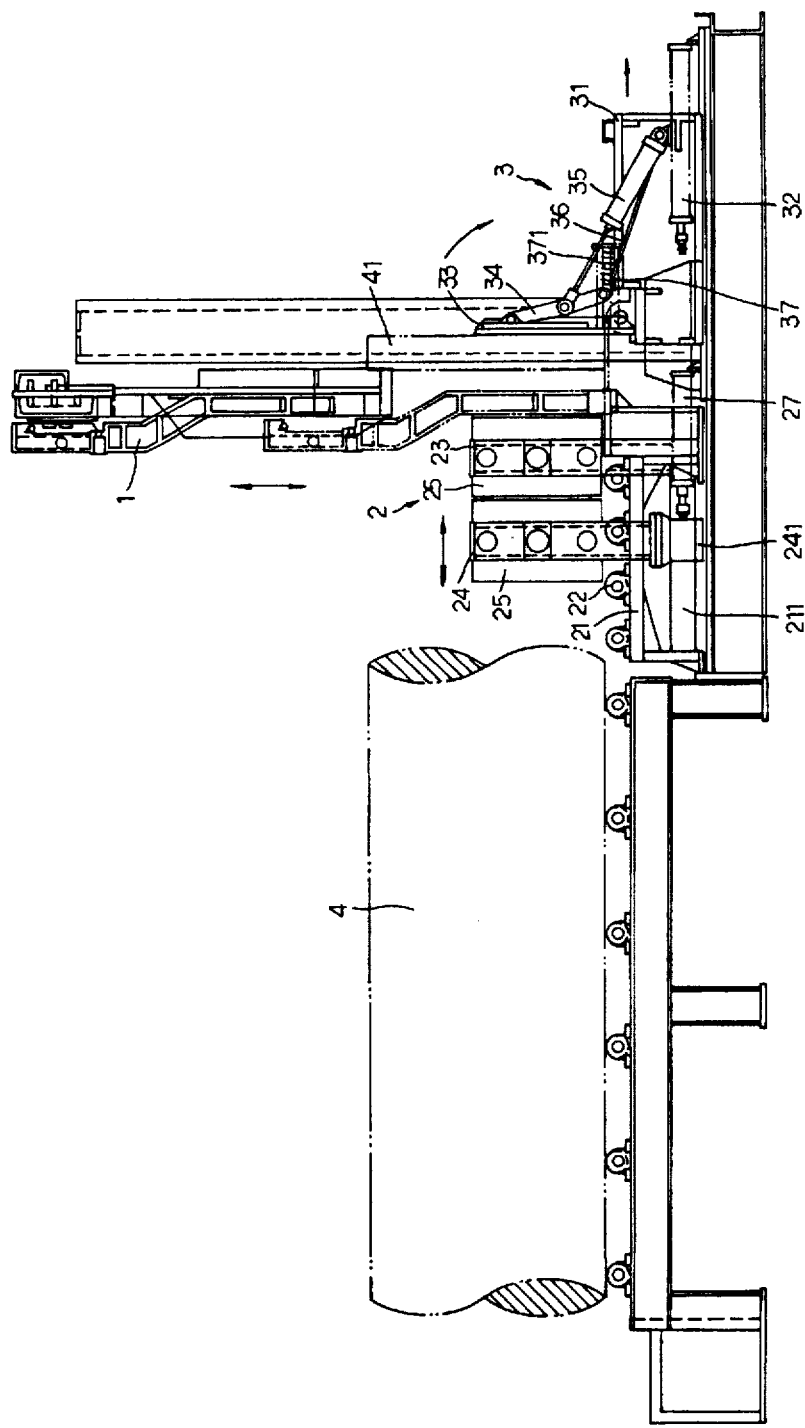
FIG. 1 is a schematic side view of the present invention.
Figure 2:
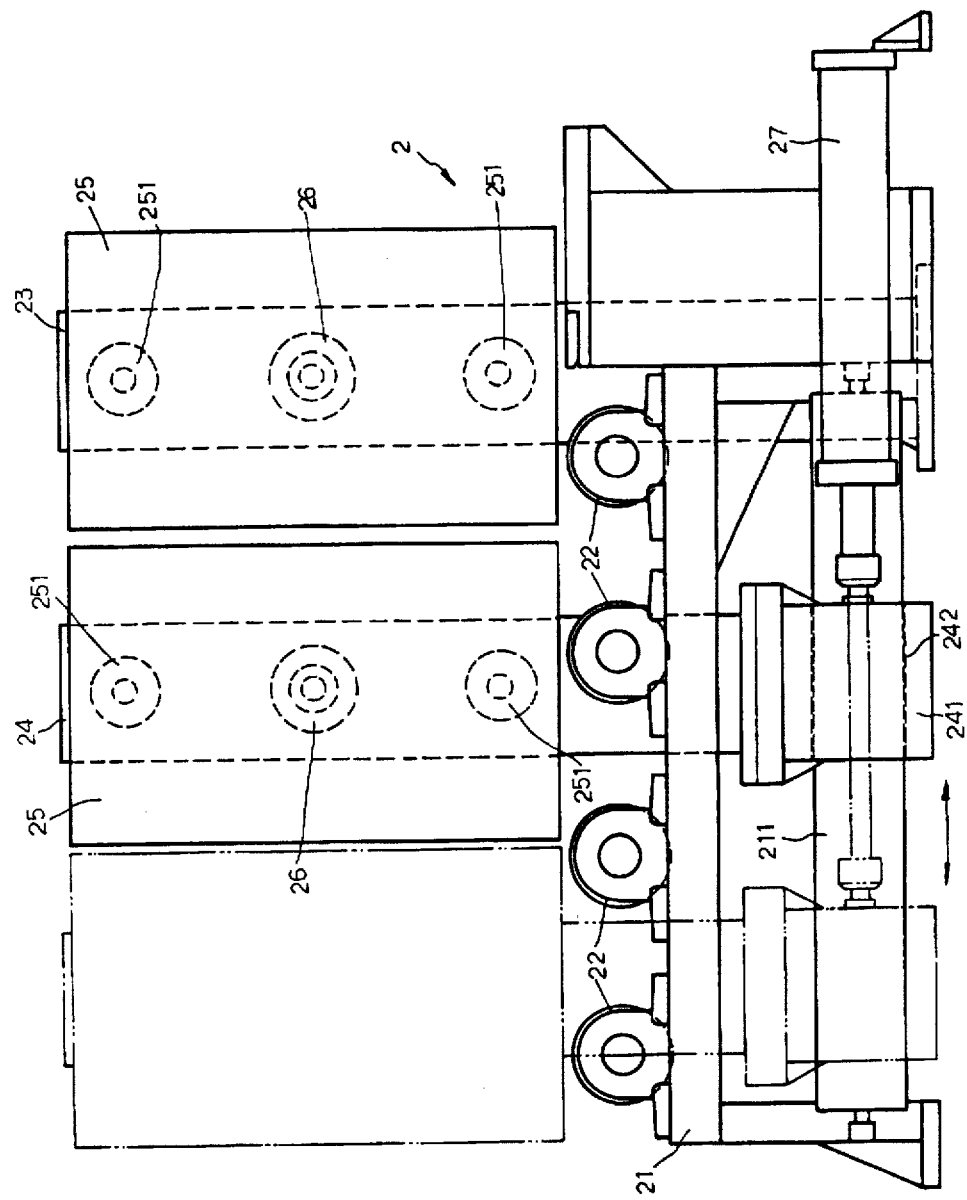
FIG. 2 is a schematic side view of the material feed mechanism of the present invention.
Figure 3:
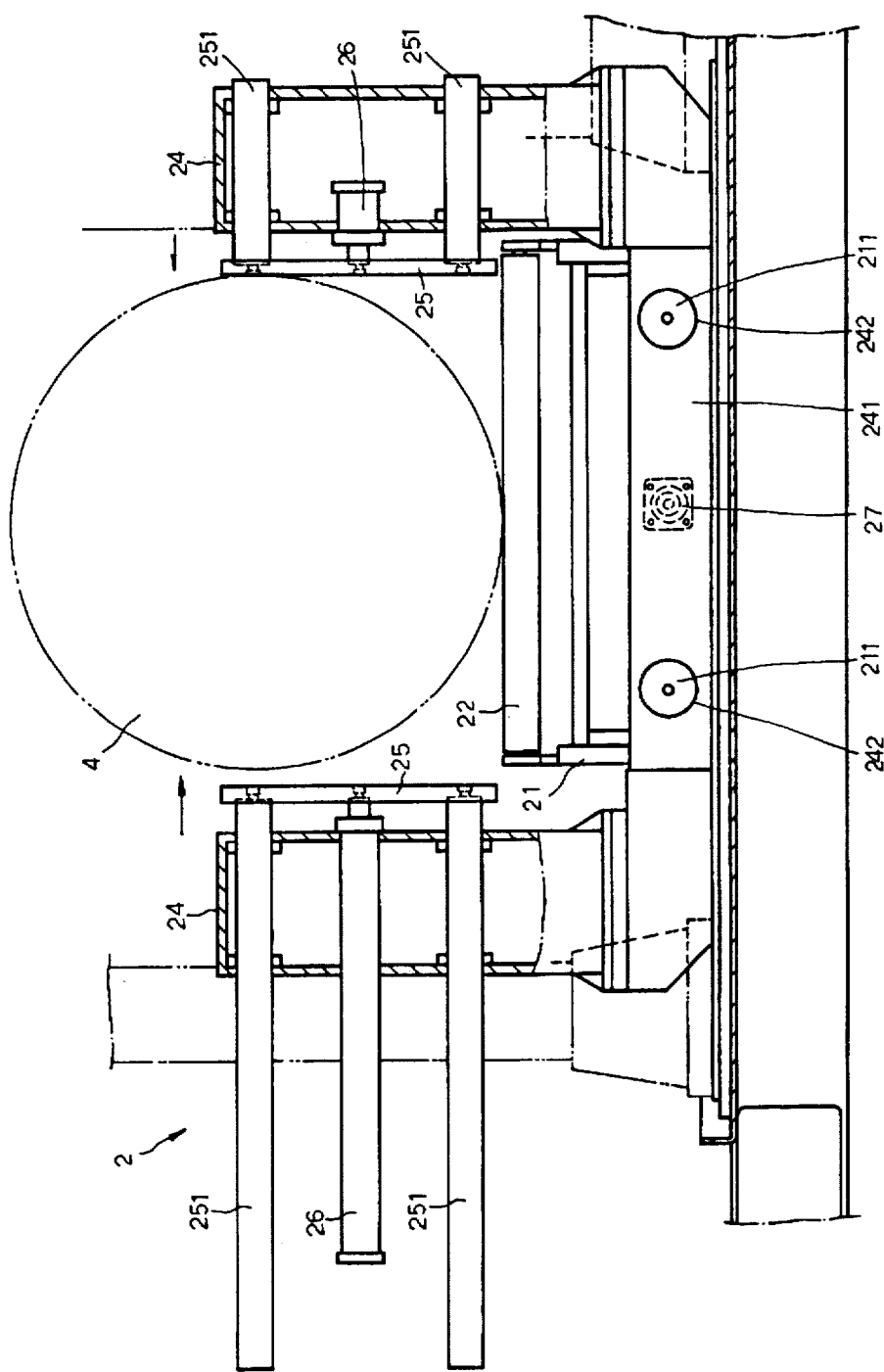
FIG. 3 is a schematic front view of the material feed mechanism of the present invention.

As shown in FIGS. 1, 2 and 3, the present invention comprises a cutting machine 1 with a material feed mechanism 2. A cut pieces placement mechanism 3 is provided at the rear of the cutting machine 1. The material feed mechanism 2 includes a stationary platform 21 having a plurality of conveying rollers 22. A stationary clamp set 23 straddles one end of the stationary platform 21 near the cutting machine 1. A movable clamp set 24 straddles the other end of the stationary platform 21. The stationary clamp set 23 and the movable clamp set 24 both include a clamping plate 25. A clamping hydraulic cylinder 26 is provided at a central portion of the back side of each clamping plate 25. A guide rod 251 is provided at both an upper and a lower portion of the back side of each clamping plate 25. The movable clamp set 24 includes a slide seat 241. A hydraulic cylinder 27 is also provided for the slide seat 241. The hydraulic cylinder 27 drives the slide seat back and forth along a rail 211. The rail 211 passes through a hole 242 in the slide seat 241.

Figure 4:
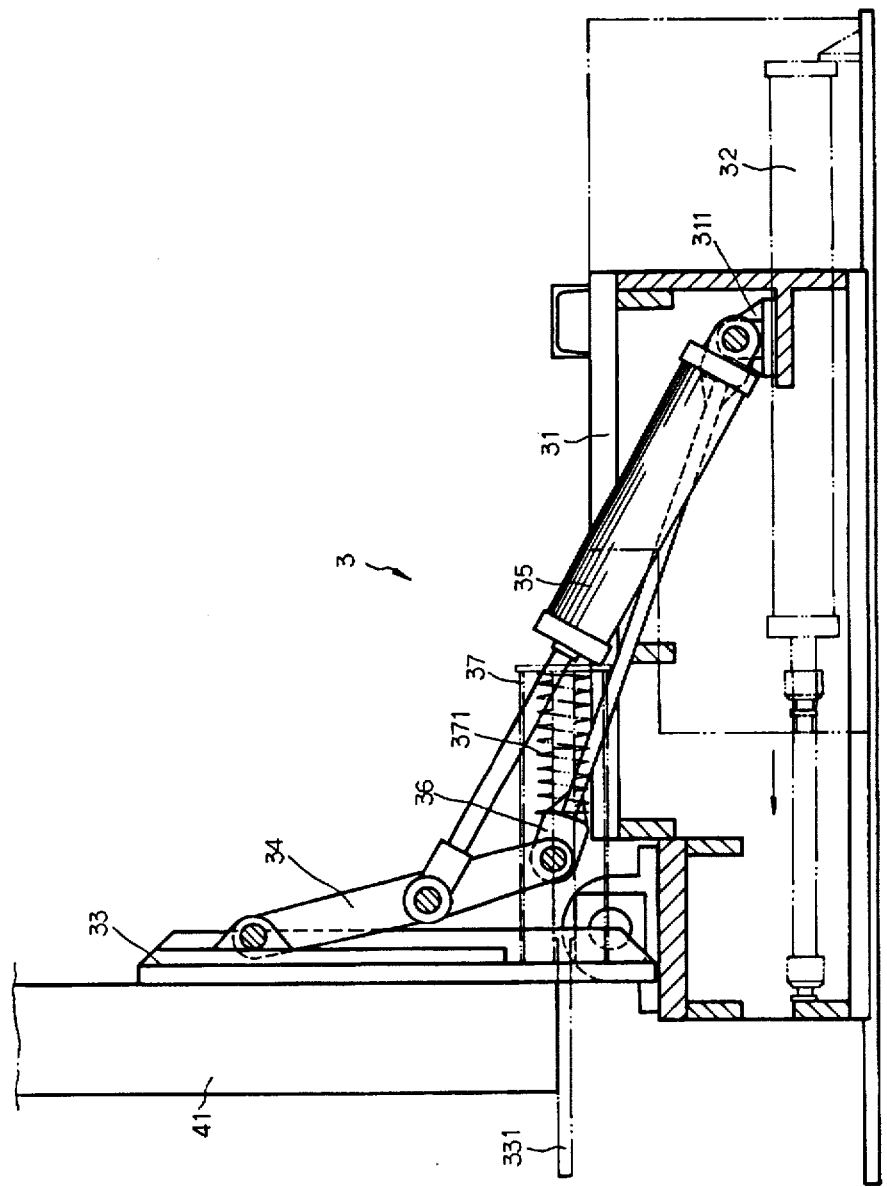
FIG. 4 is a schematic side view of a first position of the cut pieces placement mechanism of the present invention.
Figure 5:
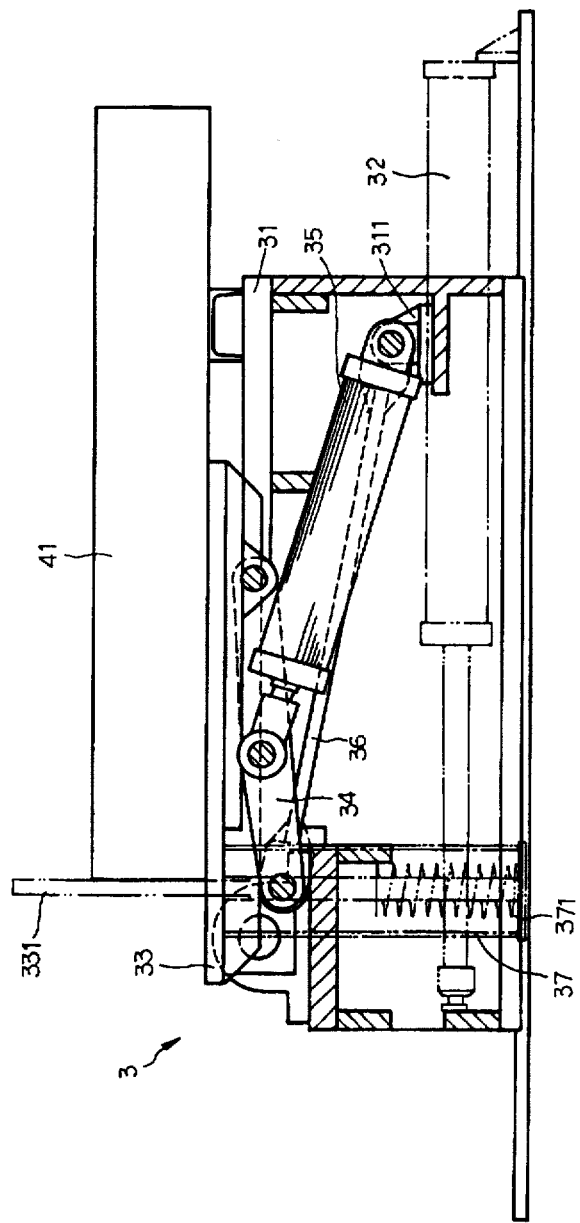
FIG. 5 is a schematic side view of the second position of the cut pieces placement mechanism of the present invention.
Figure 6:
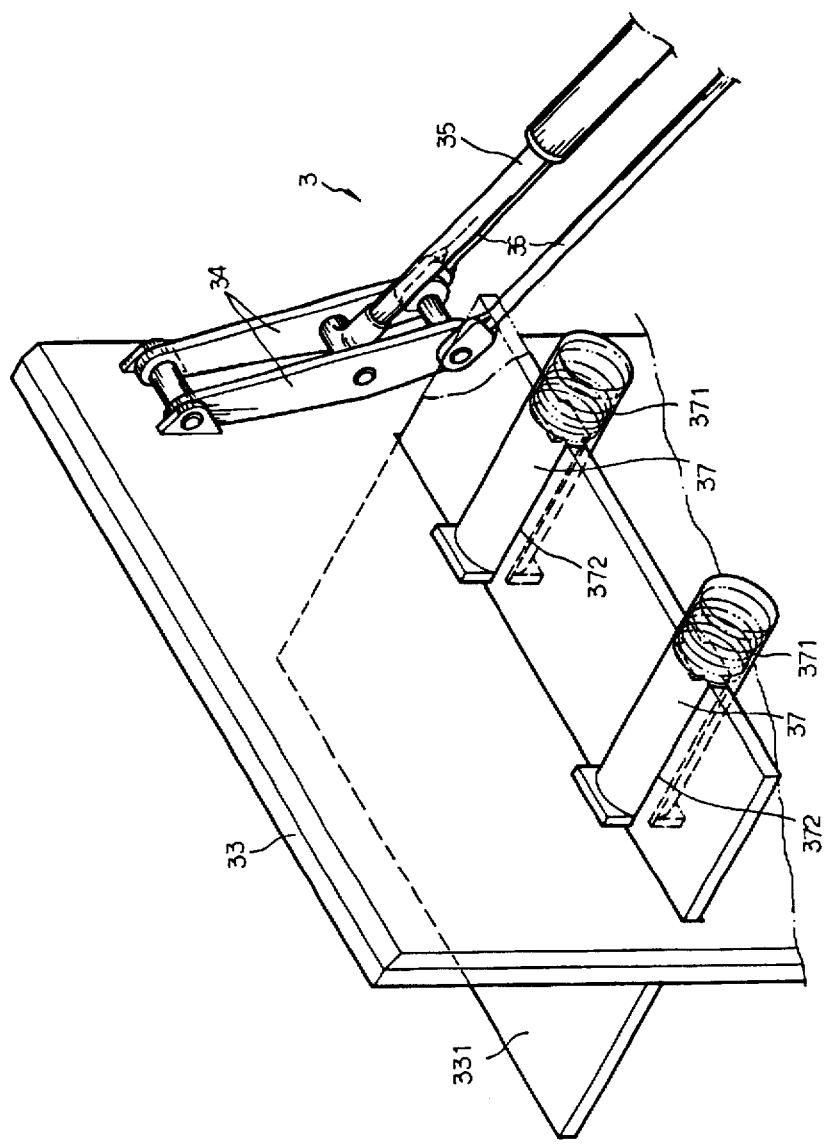
FIG. 6 is a schematic perspective view of a portion of the cut pieces placement mechanism of the present invention.

As shown in FIGS. 4, 5 and 6, the cut pieces placement mechanism 3 includes a sliding platform 31 which is connected to a hydraulic cylinder 32. A rest plate 33 is pivotably attached at the front of the sliding platform 31. The rest plate 33 includes a strut 34 which is pivotally connected to another hydraulic 35. Both sides of the strut 34 are provided on the lower ends thereof with links 36. The hydraulic cylinder 35 and the links 36 are together pivotably provided on the fixing seat 311 on one side of the sliding platform 31. A movable and extensible plate 331 is extended through a slot in the lower end of the rest plate 33. A plurality of spring fixing barrels 37 are provided with a slit 372 to allow the extensible plate 331 to move freely in the spring fixing barrels 37 at the rear of the rest plate 33. A spring 371 is provided in each spring fixing barrel 37.

By means of the above stated mechanisms, when the cutting machine 1 receives a command to cut a workpiece 4, the material feed mechanism 2 will activate the hydraulic cylinder 27 to move the slide seat 241 toward the workpiece 4. This moves the movable clamp set 24 to the workpiece 4. The clamping hydraulic cylinders 26 of the movable clamp set 24 push the clamping plates 25 to clamp the workpiece 4. When the movable clamp set 24 firmly clamps the workpiece 4, the hydraulic cylinder 27 will retract to move the slide seat 241 to the cutting machine 1. The workpiece 4 is then fixedly clamped by the stationary clamp set 23.

When the cutting machine 1 starts cutting the workpiece 4, the cut pieces placement mechanism 3 moves the sliding platform 31 to the cutting machine 1 by means of the hydraulic cylinder 32 at the bottom thereof (as shown in FIG. 4). When one piece 41 of the workpiece 4 is cut off, the cut piece 41 can stand and rest against the rest plate 33 and the extensible plate 331. At this time, the cut pieces placement mechanism 3 receives a command that causes the placement hydraulic cylinder 35 to retract its arm slowly. As the placement hydraulic cylinder 35 contracts, the rest plate 33 will be pivotally moved toward the sliding platform 31, and will be placed in a horizontal plane (as shown in FIG. 5). This causes the piece 41 to be laid down safely in a horizontal plane. The piece 41 is moved away from the rest plate 33, and then the next piece 41 can be cut.

The extensible plate 331 can be extended and retracted so as to adapt to steel of different thicknesses.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. An apparatus for cutting steel including a feed mechanism, a cutting machine, and a cut pieces placement mechanism, said cut pieces placement mechanism comprising:

a sliding platform with a fixing seat thereon, a first hydraulic cylinder connected to a rear end of said sliding platform, a rest plate pivotably attached at a first end thereof to a front of said sliding platform, a strut pivotally connected at a first end thereof to said rest plate near a second end of said rest plate, at least one link rod pivotally connected at a first end thereof to a second end of said strut, a second end of said link rod is pivotally connected to said fixing seat, a second hydraulic cylinder pivotally connected at a first end to a central portion of said strut, a second end of said second hydraulic cylinder is pivotally attached to said fixing seat, a movable and extensible plate mounted in a slot near in said rest plate, said slot being located said first end of said rest plate, a distance in which said movable plate extends through said slot is variable to allow for variable sizes of cut pieces; wherein when said placement mechanism receives a command to operate, said first hydraulic cylinder moves said sliding platform toward said cutting machine, said movable and extensible plate is thereby positioned to receive a cut piece of a workpiece stock, the cut piece is supported by said movable plate and also rests against said rest plate, said cut pieces placement mechanism then retracts said second cylinder, thereby lowering said rest plate from a vertical position to a horizontal position, such that the cut pieces are moved to a horizontal plane where the cut pieces can be safely and easily handled.

2. The apparatus as recited in claim 3, said feed mechanism comprising:

a stationary platform with a plurality of conveying rollers thereon, a stationary clamp set that straddles an end of said stationary platform near the cutting machine, said stationary clamp set includes at least one clamping plate and at least one clamping hydraulic cylinder, a movable clamp set that straddles said stationary platform, said movable clamp set moves back and forth between a distal end of said stationary platform and a position near said stationary clamp, said movable clamp set includes at least one clamping plate and at least one clamping hydraulic cylinder, said movable clamp set is slidably mounted on a rail bar by means of a slide seat, a through hole in said slide seat receives said rail bar, and a driving hydraulic cylinder installed between said slide seat and said stationary platform such that said hydraulic cylinder drives said slide seat back and forth along said rail bar; wherein said driving hydraulic cylinder is extended to drive said movable clamp set to a first position where said movable clamp set secures a workpiece, said driving cylinder thereafter being retracted so that said movable clamp set moves to a second position where the workpiece is secured by said stationary clamp set, thereby fixing the workpiece in position to be cut by the cutting machine.

* * * * *